(12) United States Patent
Pedersen

(10) Patent No.: US 8,064,718 B2
(45) Date of Patent: Nov. 22, 2011

(54) FILTER FOR ADAPTIVE NOISE REDUCTION AND SHARPNESS ENHANCEMENT FOR ELECTRONICALLY DISPLAYED PICTURES

(75) Inventor: Jesper Meldgaard Pedersen, Holstebro (DK)

(73) Assignee: Bang & Olufsen A/S, Struer (DK)

( * ) Notice: Subject to any disclaimer, the term of this patent is extended or adjusted under 35 U.S.C. 154(b) by 973 days.

(21) Appl. No.: 11/996,695

(22) PCT Filed: Feb. 24, 2006

(86) PCT No.: PCT/DK2006/000113
§ 371 (c)(1),
(2), (4) Date: Jan. 24, 2008

(87) PCT Pub. No.: WO2006/089557
PCT Pub. Date: Aug. 31, 2006

(65) Prior Publication Data
US 2009/0060370 A1   Mar. 5, 2009

(30) Foreign Application Priority Data
Feb. 24, 2005   (DK) ................................ 2005 00276

(51) Int. Cl.
*G06K 9/40* (2006.01)
(52) U.S. Cl. ...................................... 382/275; 382/268
(58) Field of Classification Search .................. 382/254, 382/274–275, 260–268, 232–251; 358/3.26–3.27; 375/240.01–240.29
See application file for complete search history.

(56) References Cited

U.S. PATENT DOCUMENTS

| 5,883,983 A | * | 3/1999 | Lee et al. | ...................... 382/268 |
| 7,373,014 B1 | * | 5/2008 | Mancuso et al. | ............. 382/268 |
| 7,778,480 B2 | * | 8/2010 | Huang et al. | ................. 382/268 |
| 2007/0280552 A1 | * | 12/2007 | Lee et al. | ...................... 382/268 |

FOREIGN PATENT DOCUMENTS

WO   2004/010381 A1   1/2004

OTHER PUBLICATIONS

Mehul P. Sampat, K.R. Castleman, A.C. Bovik, Pixel-By-Pixel Classification of MFISH Images, Engineering in Medicine and Biology, 2002. 24th Annual Conference and the Annual Fall Meeting of the Biomedical Engineering Society, EMBS/BMES Conference, 2002. Proceedings of the Second Joint. Oct. 23-26, 2002, vol. 2, pp. 999-1000.

Ismo Kauppinen and Kari Roth, Improved Noise Reduction in Audio Signals Using Spectral Resolution Enhancement With Time-Domain Signal Extrapolation, Speech and Audio Processing, IEEE Transactions on Speech and Audio Processing, vol. 13, No. 6, Nov. 2005, pp. 1210-1216.

* cited by examiner

*Primary Examiner* — Ishrat I Sherali
(74) *Attorney, Agent, or Firm* — Roberts Mlotkowski Safran & Cole, P.C.; David S. Safran

(57) ABSTRACT

Electronic images that are degraded by noise and data reduction, such as MPEG encoding, display artifacts in the reproduced image, such as ringing ("ripples") and blocks ("huge pixels"), and noise in the image may be apparent as graininess. By performing image analysis, both on a frame-by-frame and pixel-by-pixel basis it is possible to identify and separate edges in the image, ringing artifacts and the boundaries between block transitions. By applying noise reduction according to the analysis, followed by sharpness enhancement, it is possible to clean up the image for further utilization.

7 Claims, 2 Drawing Sheets

Functional block diagram

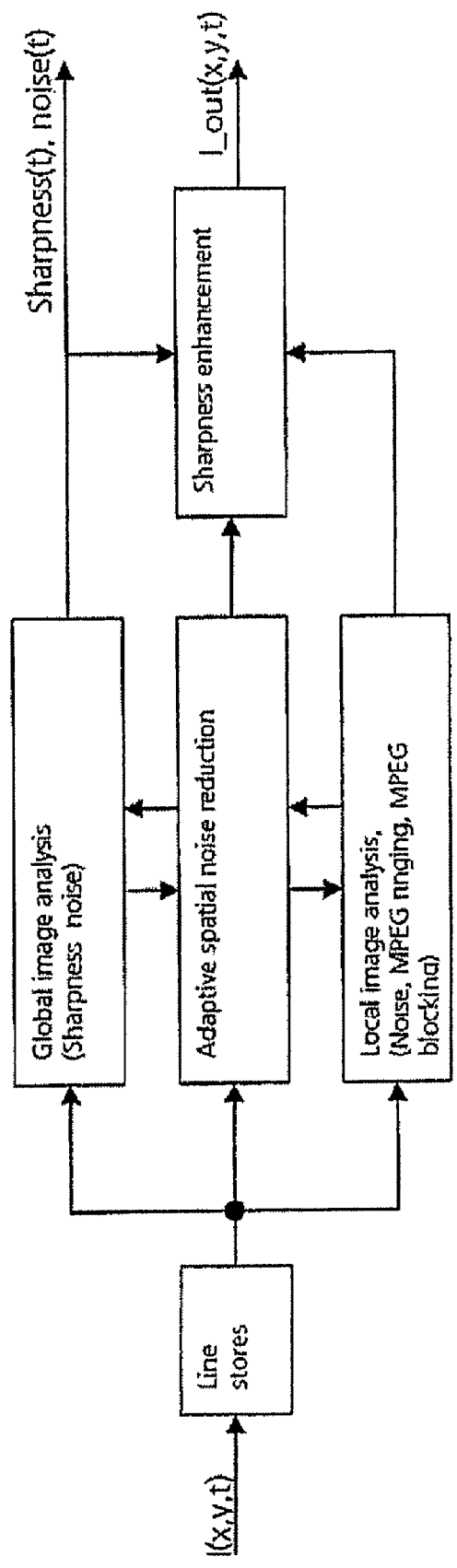
Figure 1 Functional block diagram

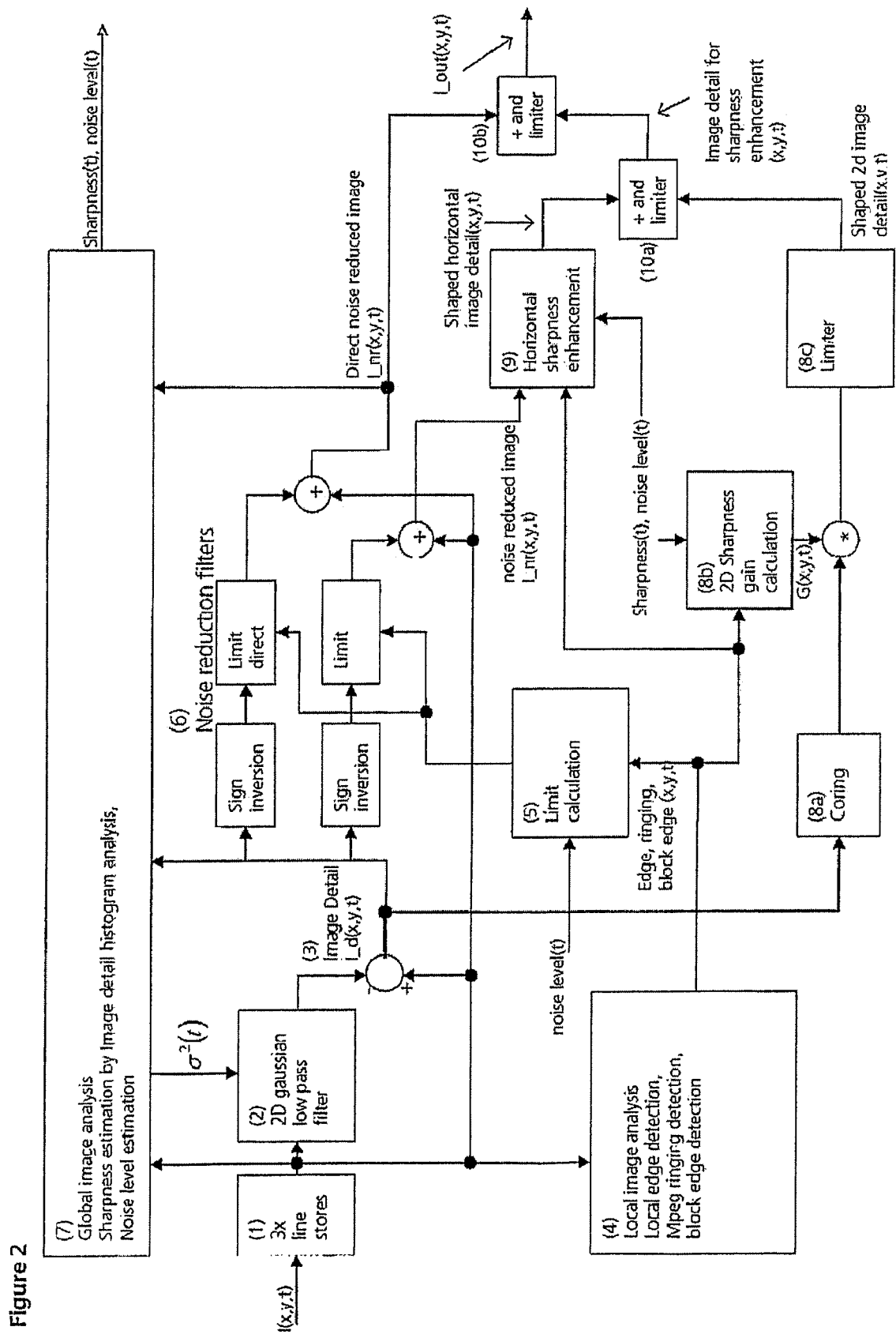
Figure 2 System block diagram

FILTER FOR ADAPTIVE NOISE REDUCTION AND SHARPNESS ENHANCEMENT FOR ELECTRONICALLY DISPLAYED PICTURES

BACKGROUND OF THE INVENTION

1. Field of the Invention

The present invention relates to methods for use in an image processing system to enhance the overall picture quality of an electronically displayed picture.

2. Description of Related Art

Modem storage and transmission of pictures occurs by electronic means, in which analog electronic signals are converted to digital groups of numbers representing the total information necessary to re-create one picture element (one pixel) on a screen, such as a CRT screen or a plasma screen or a Liquid Crystal Display. Electronic picture may also originate in the digital domain. A picture is defined by many parameters, some of which are related to the human visual perception. Contrasts between series of neighboring pixels are perceived as contours, and correct representation of such contours as well as gradual changes in e.g. chromaticity are important elements in a high quality picture representation. In particular two influences occur that reduce the quality of the perceived image: noise that introduces random stepwise variation between neighboring pixels and data reduction algorithms that introduce "ringing" and "blocking". The former refers to shadow- or ripple-like extraneous series of pixels in parallel with contrasts—in the case of lines, on both sides of the lines, and the latter refers to the generation of rectangular blocks of uniformly colored parts of a picture, which appears as if it were displayed on a tiled surface. Both phenomena may occur with varying degree of visibility. Typical present-day algorithms are of the family known as MPEG (Motion Picture Experts Group).

Various principles for reducing noise and artifacts have been used in the past, from simple averaging of the values of neighboring pixels to principles including movement information from consecutive frames in video. Reference is made to Anil Kokaram, "Motion Picture Restoration", Springer Verlag London 1998. The sophisticated methods are both very complex, calculation-intensive, and require more hardware than it is generally considered reasonable to include in equipment for home entertainment, such as TV and video monitors or computer screens.

SUMMARY OF THE INVENTION

The invention relates to a filter for adaptive noise reduction and sharpness enhancement to be applied to a data stream representing data-reduced images transmitted over a real, non-ideal channel.

The purpose of the filter is to filter out noise and MPEG artifacts, (i.e. blocking and ringing) from the received images and at the same time to enhance the sharpness of these images. Furthermore it is the purpose to perform this by means which do not require huge data registers and very fast computers.

The filtering process is controlled by globally and locally measured image features. The global image analysis measures the sharpness level of the image and the noise level of the image. The global image analysis generates an output for each received field or frame.

The local image analysis is working on a pixel-by-pixel level and measures if the current pixel is placed on an edge, an MPEG ringing or an MPEG block transition. These measurements are used to control the noise reduction and the sharpness enhancement on a pixel-by-pixel level.

The estimated sharpness and noise values are communicated to the rest of the system, containing the remaining functional blocks to form a complete TV receiver. The sharpness and noise values are controlling parameters for processing, such as temporary noise reduction level, high frequency emphasis in the scaling kernel, additional sharpness enhancement functions, etc.

The measured global sharpness value will control the sharpness enhancement. The sharpness value will indicate the bandwidth of the incoming signal. A higher sharpness values corresponds to a higher bandwidth of the signal.

This information is used to control the frequency response of the sharpness enhancement in such a way that the sharpness enhancement will be made with a filter that is tracking the highest frequency components of the incoming signal. The tracking is made such that the pass band of the sharpness enhancement filter has its centre frequency locked to the sharpness value.

The measured global noise value will control the noise reduction in such a way that for high noise values the noise reduction will be increased and for low noise values the noise reduction will be decreased. For higher noise values the sharpness enhancement will be reduced.

The local edge detection will control the noise reduction level in such a way that in case an edge is detected for the current pixel, the noise reduction will be reduced proportionally to the edge strength, i.e. the local contrast.

The local MPEG ringing artifact and MPEG block edge detection will control the noise reduction in such a way that the noise reduction will be enhanced in case of the detection of an MPEG ringing or MPEG edge.

BRIEF DESCRIPTION OF THE DRAWINGS

FIG. 1 is an overview of the functional main blocks of the system

FIG. 2 is a detailed system block diagram

DETAILED DESCRIPTION OF THE INVENTION

Filter Main Functional Blocks

The main components of the system are outlined in FIG. 1 and constitute:

A) Global image analysis

B) Local image analysis for control of C) and D) on a pixel-by-pixel basis

C) Adaptive spatial noise reduction

D) Adaptive 2-dimensional sharpness enhancement combined with horizontal sharpness enhancement.

The filter structure is intended to work on digitized analogue TV signals as well as decoded digital TV signals in standard or high definition.

The processing is performed in an YCbCr (luminance and color) representation, and received signals in other formats may be converted accordingly.

The system operates on interlaced and progressive input formats with each component represented by 8 or 10 bit.

$I(x, y, t)$ represents the incoming image.

x, y, t locates the image at its sample positions in the horizontal, vertical and temporal sampling dimension respectively.

$I\_out(x, y, t)$ represents the noise reduced and sharpness enhanced image

Sharpness(t) is the sharpness value estimated for each field.
Noise(t) is the noise value estimated at each field.
Description of Functional Block Diagram
Global Image Analysis The global image analysis measures the noise level and the sharpness level of the incoming signal. The sharpness and noise values are both determined on a field of frame basis.

Local Image Analysis for Local Control

The local image analysis measures a4local edge, a local MPEG ringing, or a local MPEG block transition. The local image analysis generates an output value for each pixel.

Adaptive Spatial Noise Reduction

On the basis of the above described measurements, the noise reduction level is determined on a pixel-by-pixel level.

The aim of the spatial noise reduction is to filter out MPEG ringing artifacts, MPEG block artifacts, and analogue noise.

Adaptive 2-Dimensional Sharpness Enhancement Combined with Horizontal Sharpness Enhancement Given the information if the current pixel is noisy and given the information how sharp the current image is, sharpness enhancement is applied.

The 2D (2-dimensional) sharpness enhancement is made with a 2-dimensional kernel.

For very low frequency input images the filter order for the sharpness enhancement needs to be high, thus 2D filtering will become too demanding on memory consumption for home entertainment use. In case of a low frequency input image the 2D sharpness enhancement is maintained by a horizontal sharpness (1D) enhancement filter only.

The system is described based on the system block diagram in FIG. 2.

(1) Line Stores

To enable vertical processing a memory core is built into this system.

The memory core consists of 9 line stores. The line stores are divided for the 3 image components.

The line cores are configured as dual port RAM devices.

(2) Gaussian Low Pass Filter

The Gaussian low pass filter consists of a 2-dimensional low pass filter.

The impulse response of the filter is an approximated 2D Gaussian function.

The frequency response of the filter can be adjusted by the input parameter $\sigma^2$, where the variances for the Gaussian filter can be changed. This parameter can change on a field by field basis.

(3) Image Detail

Information of the image details is generated by taking the difference between the input image and the Gaussian low pass filtered image from (2). Other methods of obtaining a high-pass function may be employed. The image details will contain information about the image details as well as the noise in the image.

(4) Local Image Analysis
4a) Edge Detection

High frequency edges in the image will in (2) be identified as image detail, and image noise will be detected as high frequency image detail.

In order to distinguish between an edge and image noise, an edge detector is utilized. The edge detection will detect edges horizontally, vertically and in the two diagonals.

The noise reduction in (6) will now be reduced on the current pixel, in case of a detected edge.

4b) MPEG Ringing Detection

MPEG ringing detection is utilized, in order to estimate the presence of an MPEG ringing near a steep edge in the image.

In case a MPEG ringing is detected, the noise reduction in (6) is increased for the current pixel.

4c) MPEG Block Boundary Detection

MPEG block boundary detection is utilized, in order to estimate the placement and presence of block boundaries for the decoded MPEG material. The noise reduction (6) will be increased on the current pixel, in case of a detected MPEG block boundary.

(5) Limit Calculation

The noise reduction described in (6) is controlled by a limit value.

The limit value determines on a per pixel basis, how much low pass filtering that is applied in (6).

(6) Noise Reduction Block

The noise reduction filter is implemented by first inverting the sign of the high pass image.

Then the high pass image is limited in value, by limiting values above the limit calculated in (5) to the limit value and limiting values below the negative limit value to the negative limit value.

The noise reduction is now made by adding the sign-inverted and limited high pass image to the original and delay compensated image. The delay compensation serves to synchronize the signal and the processing.

Two separate noise reduction filters are utilized, one for the direct signal, and one for the signal which is fed to the sharpness enhancement block.

This splitting of the signal is made in order to be able to have a fine noise reduction level for the direct signal, and a stronger noise reduction for the signal fed to the sharpness enhancement block.

(7) Global Image Analysis
7a) Sharpness Estimation by Histogram Calculation of the Image Details Generated in (2)

To estimate the sharpness of the current image, histogram analysis of the image details in (2) is utilized.

As the image details will contain values from [−255; 255], [−1023; 1023] the absolute value of the image details is taken before the histogram is calculated.

The histogram is a 32 bin histogram.

The sharpness is now estimated as the highest bin number in the histogram having a content different from zero.

A totally flat image, with a uniform grey level will now be estimated to sharpness value=0.

Blurred images will now be given a low sharpness value sharpness value (1-7), sharper images a higher sharpness value (sharpness value 8-16), the image detail histogram will tend to be stretched more out against higher bin numbers. Test patterns will typically have sharpness values from 17-30.

Pure unfiltered graphics will have the sharpness value 31.

7b) Image Noise Estimation

The global image noise is estimated as the difference between the noise-reduced output from (6) and the input image.

This difference image will contain information of the noise in the image.

As the difference image will contain positive as well as negative values, the absolute value is taken. The noise value in now calculated as the sum of the absolute values of the difference image. The noise value is thus calculated once per field or frame.

8a) Coring

To avoid the amplification of noise a coring or amplitude window circuit is applied before the amplifier in 8b)

8b) Gain Calculation

The filter gain is calculated based on the sharpness and noise level.

8c) Limiter

To avoid excessive enhancement of steep transients in the image a limiter of the image detail information is incorporated. The limiter function is an approximated hyperbolic tangent function.

(9) Horizontal Sharpness Enhancement

For input images with a very low measured sharpness value (measured as described in (7)) it is beneficial to enhance the sharpness with a higher order filter (e.g. a 7 tap FIR kernel). As this order of filtering will become too calculation expensive for 2D processing, this enhancement is made with a 1 dimensional horizontal filter kernel.

10a) Output Formation—Part a

In formation of the output the image details (10) from the spatial sharpness enhancer and the horizontal sharpness enhancer are added.

10b) Output Formation—Part b

The output of this filter is a summation of the noise reduced image and the image details for sharpness enhancement. The summation is followed by a limitation to the actual dynamic range 0 to 255, or 0 to 1024.

Applications

The invention can be applied in video processing systems targeting flat screen monitors (e.g. LCD and Plasma).

It will be understood that once the signal has been converted to digital representation of data, its manipulation may take place in dedicated processors, RISC processors or general purpose computers, the outcome of the manipulation being solely dependent on the instructions performed on the data under the control of the program written for the processor in order to obtain the function. The physical location of the data at any one instant (i.e. in varying degrees of processing) may or may not be related to a particular block in the block diagram, but the representation of the invention in the form of interconnected functional blocks provides the skilled person with sufficient information to obtain the advantages of the invention.

The foregoing description of the specific embodiments will so fully reveal the general nature of the present invention that others skilled in the art can, by applying current knowledge, readily modify or adapt for various applications such specific embodiments without undue experimentation and without departing from the generic concept, and therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of forms without departing from the invention.

Thus, the expressions "means to . . . " and "means for . . . ", or any method step language, as may be found in the specification above and/or in the claims below, followed by a functional statement, are intended to define and cover whatever structural, physical, chemical, or electrical element or structure, or whatever method step, which may now or in the future exist which carries out the recited functions, whether or not precisely equivalent to the embodiment or embodiments disclosed in the specification above, i.e., other means or steps for carrying out the same function can be used; and it is intended that such expressions be given their broadest interpretation.

What is claimed is:

1. A procedure for providing a cleaned-up picture from a bandwidth-limited, noise-reduced, and data reduced input stream of electronic data representing moving or stationary image information with noise content, said image information containing artefacts due to data reduction and bandwidth limitation, comprising the following steps
   1) decoding the data reduced stream of data
   2) feeding the data to a first analyzer (7) for global image analysis and to a second analyzer (4) for local image analysis,
   3) the output of the first analyzer (7) being a frame-by-frame sharpness function and a frame-by-frame noise level function
   4) the output of the second analyzer (4) being a pixel-by-pixel classification of the pixel as part of an edge, part of a ringing artefact, or part of a block edge artefact
   5) the noise level output of the first analyzer (7) being combined in a limit calculation block (5) with the output from the second analyzer (4)
   6) using the output from the limit calculation block (5) to determine the bandwidth of a noise reducing low-pass filter (6), the bandwidth in (6) being increased on the current pixel, in case of a detected edge, in order to obtain data relating to a noise-reduced image with good contrast
   7) the sharpness output from the first analyzer (7) being combined with the output of the second analyzer (4) in a two-dimensional sharpness gain calculation block (8b)
   8) applying the gain factor of gain calculation block (8b) in a sharpness enhancement limiter (8c), the pass band of the sharpness enhancement filter having its centre frequency locked to the sharpness value
   9) the output being formed as the sum of sharpness-enhanced image detail from the limiter (8c) and the noise reduced signal from the noise reducing filter (6).

2. A procedure according to claim 1, wherein the step of estimating the global sharpness value in the block (7) is performed by histogram analysis of the image details identified in the high frequency content of the decoded image data.

3. A procedure according to claim 2, wherein for low measured sharpness values in block (7), the sharpness is enhanced with respect to horizontal (serial) signals only in block (9).

4. A procedure according to claim 1, wherein the input stream of electronic data represents a colour image.

5. A procedure according to claim 4, wherein the signal processing is performed in YCbCr (luminance and colour).

6. An apparatus for performing the procedure of claim 1, wherein the apparatus comprises the following functional blocks:
   a decoder for data reduced image information, an estimator (7) for global sharpness based on subtraction of a low-pass filtered signal from the total decoded signal, a noise estimator (7), an edge detector (4), a detector for ringing artefacts (4), a detector (4) for block boundary artefacts, a noise reduction block (6) performing pixel-by-pixel mixing of an input value and a low-pass filtered input value in dependence of detected edges and artefacts, a sharpness enhancement block (8b), a block (9) working on a horizontal line representation of the image, summing blocks (10,10b), a dynamics limiting block (8c), and a video signal output block.

7. Use of a procedure according to claim 1 on a data reduced signal in which the data reduction is performed according to the standards of the Motion Picture Expert Group (MPEG).

* * * * *